United States Patent
Liu

(10) Patent No.: US 10,313,210 B2
(45) Date of Patent: Jun. 4, 2019

(54) METHOD FOR ACQUIRING MONITORING DATA AND SYSTEM THEREOF, TASK DISTRIBUTION SERVER AND AGENT

(71) Applicant: Tencent Technology (Shenzhen) Company Limited, Shenzhen (CN)

(72) Inventor: Yongfeng Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 614 days.

(21) Appl. No.: 14/615,199

(22) Filed: Feb. 5, 2015

(65) Prior Publication Data
US 2015/0156087 A1    Jun. 4, 2015

Related U.S. Application Data

(63) Continuation of application No. PCT/CN2014/081806, filed on Jul. 8, 2014.

(30) Foreign Application Priority Data

Jul. 17, 2013    (CN) .......................... 2013 1 0300712

(51) Int. Cl.
*H04L 12/24*    (2006.01)
*H04L 12/26*    (2006.01)
*H04L 29/08*    (2006.01)

(52) U.S. Cl.
CPC ............ *H04L 43/04* (2013.01); *H04L 41/046* (2013.01); *H04L 43/12* (2013.01); *H04L 67/32* (2013.01)

(58) Field of Classification Search
CPC ....... H04L 43/04; H04L 41/046; H04L 43/12; H04L 67/32
(Continued)

(56) References Cited

U.S. PATENT DOCUMENTS 5,655,081 A * 8/1997 Bonnell .............. G06F 11/0748
                                                                  709/202
6,519,568 B1 * 2/2003 Harvey ................ G06Q 20/203
                                                                  702/14
(Continued)

FOREIGN PATENT DOCUMENTS

CN          101018150 A          8/2007
CN          101137175 A          3/2008
(Continued)

OTHER PUBLICATIONS

Wikipedia, Simple Network Management Protocol, Apr. 16, 2013, https://en.wikipedia.org/w/index.php?title=Simple_Network_Management_Protocol&oldid=550608482.*
(Continued)

*Primary Examiner* — James E Springer
(74) *Attorney, Agent, or Firm* — Morgan, Lewis & Bockius LLP

(57) ABSTRACT

A method for acquiring monitoring data and a system thereof, a task distribution server and an agent are disclosed. The method for acquiring the monitoring data includes: receiving registrations of the agent and a gathering device by the task distribution server; receiving, by the task distribution server, an acquiring instruction sent by the gathering device; and sending, by the task distribution server, the acquiring instruction to the agent to instruct the agent to acquire the monitoring data. Hence, a flexibility in acquiring the monitoring data is improved.

9 Claims, 6 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 6,697,845 | B1* | 2/2004 | Andrews | H04L 41/0213 709/208 |
| 7,165,087 | B1* | 1/2007 | Graupner | G06F 8/61 709/202 |
| 8,825,845 | B1* | 9/2014 | Easttom | H04L 41/046 709/224 |
| 2004/0261069 | A1* | 12/2004 | Verbeke | G06F 9/44521 717/166 |
| 2006/0026301 | A1* | 2/2006 | Maeda | H04L 29/12339 709/246 |
| 2007/0156880 | A1* | 7/2007 | Kim | H04L 41/046 709/223 |
| 2009/0198689 | A1* | 8/2009 | Frazier | G06F 21/645 |
| 2010/0332630 | A1* | 12/2010 | Harlow | H04L 12/2697 709/221 |
| 2011/0069953 | A1* | 3/2011 | Bronstein | H04L 12/2801 398/45 |
| 2016/0188181 | A1* | 6/2016 | Smith | G06F 3/048 715/765 |
| 2017/0063566 | A1* | 3/2017 | Seminario | H04L 12/2816 |

FOREIGN PATENT DOCUMENTS

| | | |
|---|---|---|
| CN | 101370024 A | 2/2009 |
| CN | 101515863 A | 8/2009 |
| CN | 102045402 A | 5/2011 |
| CN | 102055611 A | 5/2011 |

OTHER PUBLICATIONS

ISR and Written Opinion to PCT International Application No. PCT/CN2014/081806 dated Oct. 10, 2014, (10p).
ISR to International Application No. PCT/CN2014/081806 dated Oct. 10, 2014, (4p).
Office Action and Summary of Corresponding Chinese Application No. 201310300712.0 dated Apr. 27, 2018, 8 pages.

* cited by examiner

METHOD FOR ACQUIRING MONITORING DATA AND SYSTEM THEREOF, TASK DISTRIBUTION SERVER AND AGENT

CROSS REFERENCE OF RELATED APPLICATION

The present application is a continuation application of PCT/CN2014/081806 filed on Jul. 8, 2014, which claims the priority to Chinese Patent Application No. 201310300712.0, entitled "METHOD FOR ACQUIRING MONITORING DATA AND SYSTEM THEREOF, TASK DISTRIBUTION SERVER AND AGENT", filed on Jul. 17, 2013 with the State Intellectual Property Office of People's Republic of China, which are incorporated herein by reference in their entireties.

FIELD

The present application relates to the field of data processing, and in particular, to a method for acquiring monitoring data and a system thereof, a task distribution server and an agent.

BACKGROUND

At present, the cloud computing technology develops rapidly. As the machine scale of a data center of a public cloud is enlarged continuously, how to rapidly acquire and process monitoring data of machines in a whole network becomes a significant issue in cloud monitoring.

Conventionally, monitoring data is mainly acquired with two approaches: an agent-based approach and an agentless approach. With the agentless approach, a simple network management protocol (SNMP) protocol is required and the machines should support a relative interface. Hence, the agentless approach is not flexible and is rarely used. Conventionally, it is a mainstream to arrange an agent in the whole network and acquire the monitoring data with the agent-based approach. In a conventional agent-based approach, the agent periodically reports the monitoring data to a receiving server, while the receiving server can only receive passively. Therefore, the agent-based approach has disadvantages such as low data flexibility, low expandability, low manageability and poor performance.

SUMMARY

A method for acquiring monitoring data and a system thereof, a task distribution server and an agent are provided in the disclosure to solve at least one of the above disadvantages.

A method for acquiring monitoring data is provided in the disclosure. The method includes: receiving, by a task distribution server, registrations of an agent and a gathering device; receiving, by the task distribution server, an acquiring instruction sent by the gathering device; and sending, by the task distribution server, the acquiring instruction to the agent to instruct the agent to acquire the monitoring data.

A method for acquiring monitoring data is provided in the disclosure. The method includes: registering at a task distribution server by an agent; receiving, by the agent, an acquiring instruction sent by the task distribution server, where the acquiring instruction is sent by a gathering device to the task distribution server and is for instructing the agent to acquire the monitoring data; and acquiring the monitoring data by the agent in response to the acquiring instruction.

A method for acquiring monitoring data is provided in the disclosure. The method includes: registering at a task distribution server by a gathering device; and sending an acquiring instruction to the task distribution server by the gathering device, where the task distribution server sends the acquiring instruction to an agent to instruct the agent to acquire the monitoring data.

A task distribution server is provided in the disclosure. The task distribution server includes: a registration unit, for receiving registrations of an agent and a gathering device; a receiving unit, for receiving an acquiring instruction sent by the gathering device; and a sending unit, for sending the acquiring instruction to the agent to instruct the agent to acquire monitoring data.

An agent is provided in the disclosure. The agent includes: a registration unit, for registering at a task distribution server; a receiving unit, for receiving an acquiring instruction sent by the task distribution server, where the acquiring instruction is sent by a gathering device to the task distribution server and is for instructing the agent to acquire monitoring data; and an acquisition unit, for acquiring the monitoring data in response to the acquiring instruction.

A gathering device is provided in the disclosure. The gathering device includes: a registration unit, for registering at a task distribution server; and a sending unit, for sending an acquiring instruction to the task distribution server, where the task distribution server sends the acquiring instruction to an agent to instruct the agent to acquire monitoring data.

A system for acquiring monitoring data is provided in the disclosure. The system includes: a task distribution server, an agent and a gathering device. The task distribution server is for receiving registrations of the agent and the gathering device; the gathering device is for sending an acquiring instruction to the task distribution server; and the agent is for receiving the acquiring instruction via the task distribution server and acquiring the monitoring data in response to the acquiring instruction.

With the present disclosure, the disadvantage that conventional methods for acquiring the monitoring data are not flexible is solved and the flexibility in acquiring the monitoring data is improved.

BRIEF DESCRIPTION OF THE DRAWINGS

Drawings are provided as a part of the disclosure for further understanding the disclosure. Exemplary embodiments of the disclosure are intended to explain rather than to limit the disclosure.

DETAILED DESCRIPTION OF EMBODIMENTS

It should be noted that, embodiments of the disclosure and features in the embodiments may be combined with each other in the case of no confliction. The disclosure is detailed hereinafter by reference to drawings and in conjunction with the embodiments.

For getting better understood by those skilled in the art, a technical solution of the disclosure is described clearly and completely hereinafter in conjunction with the drawings used in the embodiments of the disclosure. Obviously, the described embodiments are only part of rather than all of the embodiments of the disclosure. Any other embodiment obtained by those skilled in the art based on the embodiments of the disclosure without creative works shall fall into the scope of the disclosure.

It should be noted that, terminologies such as "first" and "second" in the specification, claims and the description of the drawings are only used to distinguish similar objects, rather than to describe a certain order. It should be understood that the objects described in this manner may be exchanged under proper conditions, and accordingly, the described embodiments of the disclosure, for example, may be implemented in orders different from an order illustrated or described herein. Moreover, terminologies of 'comprise', 'include' and any variant of them are intended to be non-exclusive. For example, processes, methods, systems, productions or devices including a series of steps or units are not limited to the clearly listed steps or units. Steps or units which are not clearly listed or intrinsic steps or units may further be included in the processes, methods, systems, productions or devices.

A system for acquiring monitoring data is provided according to an embodiment of the disclosure, to acquire the monitoring data.

Figure 1:
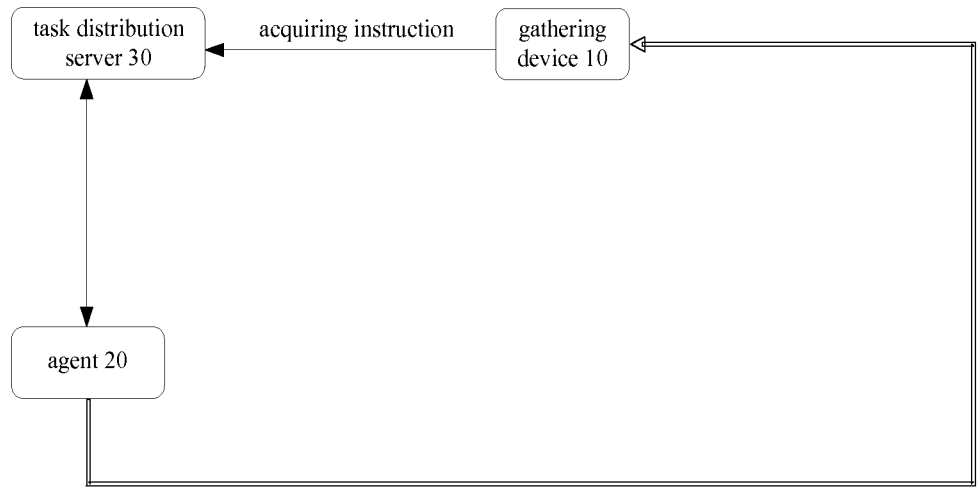
FIG. 1 is a schematic diagram of a system for acquiring monitoring data according to a first embodiment of the disclosure.

FIG. 1 is a schematic diagram of a system for acquiring monitoring data according to a first embodiment of the disclosure.

As shown in FIG. 1, the system for acquiring the monitoring data includes a gathering device 10, an agent 20 and a task distribution server 30.

The gathering device 10 is programmed to gather the monitoring data. In the system for acquiring the monitoring data, acquired monitoring data is sent to the gathering device 10. The gathering device 10 may be a data crawler. The gathering device 10 sends an acquiring instruction if it is required to gather the monitoring data. In the system for acquiring the monitoring data, the gathering device 10 sends the acquiring instruction to the task distribution server 30, the acquiring instruction is further sent to the agent 20 via the task distribution server 30, and the agent 20 acquires the monitoring data.

The task distribution server 30 is programmed to receive registrations of the agent 20 and the gathering device 10. After the task distribution server 30 receives the registrations of the agent 20 and the gathering device 10, the gathering device 10 may send the acquiring instruction to the agent 20 via the task distribution server 30, the agent 20 may receive the acquiring instruction from the gathering device 10 via the task distribution server 30, and the task distribution server 30 may send the monitoring data, which is acquired by the agent 20 in response to the acquiring instruction, to a corresponding gathering device 10.

The agent 20 is for receiving the acquiring instruction from the gathering device 10 via the task distribution server 30, acquiring the monitoring data in response to the acquiring instruction, and sending the acquired monitoring data to the gathering device 10. The agent 20 may directly report the acquired monitoring data to the gathering device 10, or may report the acquired monitoring data to the gathering device 10 via the task distribution server 30.

If the acquired monitoring data is directly reported to the gathering device 10, the data is not sent through the task distribution server 30. Hence, a high transmission efficiency is achieved and the task distribution server 30 has no performance bottleneck. If the acquired monitoring data is reported to the gathering device 10 via the task distribution server 30, the gathering device 10 interacts with only the task distribution server 30. Hence, the gathering device is insulated from the outside by the task distribution server 30, and accordingly, a high security is achieved.

In the system for acquiring the monitoring data according to the embodiment, after the gathering device 10 and the agent 20 register at the task distribution server 30, the gathering device 10 may send the acquiring instruction to the agent 20 via the task distribution server 30, and the agent 20 acquires the monitoring data in response to the acquiring instruction and reports the monitoring data. Therefore, the gathering device 10 may actively gather the monitoring data, and the flexibility in acquiring the monitoring data is improved.

In the system for acquiring the monitoring data according to the embodiment of the disclosure, the agent 20 may register at the task distribution server 30 in the following way:

sending a registration request, an identification of the agent and an acquiring index supported by the agent to the task distribution server by the agent; and receiving, by the agent, a registration accomplishment message returned from the task distribution server, to accomplish a registration at the task distribution server 30.

Correspondingly, in the system for acquiring the monitoring data according to the embodiment of the disclosure, the gathering device 10 may register at the task distribution server 30 in the following way:

sending a registration request to the task distribution server by the gathering device; and receiving, by the gathering device, a registration accomplishment message returned from the task distribution server, to accomplish a registration at the task distribution server.

In the system for acquiring the monitoring data according to the embodiment of the disclosure, for reducing unnecessary loss, the agent 20 may have a sleep state in which no acquisition is performed. The agent sends a task assignment request to the task distribution server after registering at the task distribution server. After receiving the task assignment request, the task distribution server determines whether there is a task to be allocated, and returns, if it is determined that there is no task to be allocated, a no task message to the agent. The agent enters the sleep mode after receiving the no task message.

In the system for acquiring the monitoring data according to the embodiment of the disclosure, for timely detecting a state of the agent, the agent may further send a pre-gathering message to the task distribution server. The pre-gathering message indicates that the agent is in an idle state. After receiving the pre-gathering message from the agent, the task distribution server determines that the agent is in the idle state.

The acquiring instruction may include an identification of an agent to perform an acquisition, an acquiring index and a data transmission mode. In the system for acquiring the monitoring data according to the embodiment of the disclosure, the task distribution server is further for reading the identification of the agent, the acquiring index and the data transmission mode from the acquiring instruction, sending the acquiring instruction to the agent corresponding to the identification, and assigning the acquiring index and the data transmission mode to the agent corresponding to the identification.

In the system for acquiring the monitoring data according to the embodiment of the disclosure, for performing a targeted acquisition based on the acquiring index, the agent corresponding to the identification acquires monitoring data corresponding to the acquiring index and sent in the data transmission mode, after the task distribution server sends the acquiring instruction to the agent corresponding to the identification and assigns the acquiring index and the data transmission mode to the agent corresponding to the identification.

In the system for acquiring the monitoring data according to the embodiment of the disclosure, the gathering device 10 may include one or multiple gathering devices, the agent 20 may include one or multiple agents, and the task distribution server 30 may include one or multiple task distribution servers.

Figure 2:
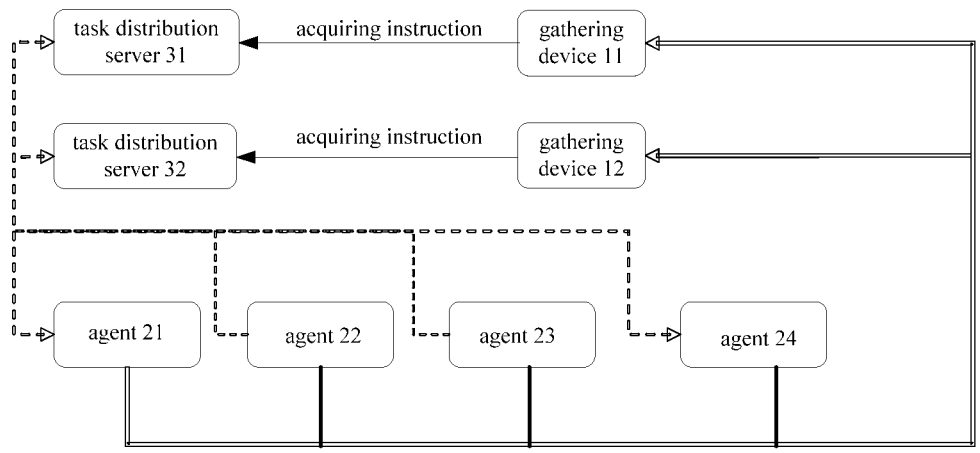
FIG. 2 is a schematic diagram of a system for acquiring monitoring data according to a second embodiment of the disclosure.

FIG. 2 is a schematic diagram of a system for acquiring monitoring data according to a second embodiment of the disclosure.

As shown in FIG. 2, the system for acquiring the monitoring data includes gathering devices 11 and 12, task distribution servers 31 and 32, and agents 21, 22, 23 and 24. The task distribution server 31 is for receiving an acquiring instruction from the gathering device 11, and sending the acquiring instruction to any one or any combination of the agents 21, 22, 23 and 24 to instruct the any one or any combination of the agents 21, 22, 23 and 24 to acquire the monitoring data. The task distribution server 32 is for receiving an acquiring instruction from the gathering device 12, and sending the acquiring instruction to any one or any combination of agents 21, 22, 23 and 24 to instruct the any one or any combination of the agents 21, 22, 23 and 24 to acquire the monitoring data.

It should be noted that, FIG. 2 only illustrates one example, and many variants may be obtained according to the embodiment of the disclosure. For example, the task distribution server 31 or 32 may receive the acquiring instruction from any one of the gathering devices and then send the acquiring instruction to any one or multiple agents.

A task distribution server is further provided according to an embodiment of the disclosure. The task distribution server may be applied to the system for acquiring the monitoring data according to the aforementioned embodiments of the disclosure.

Figure 3:
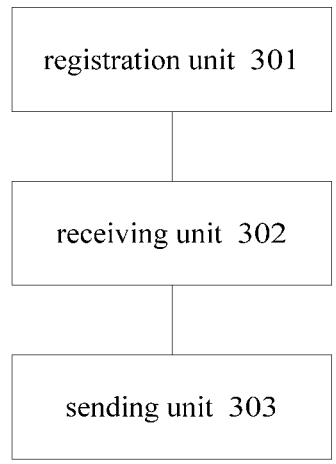
FIG. 3 is a schematic diagram of a task distribution server according to a third embodiment of the disclosure.

FIG. 3 is a schematic diagram of a task distribution server according to a third embodiment of the disclosure.

As shown in FIG. 3, the task distribution server includes a registration unit 301, a receiving unit 302 and a sending unit 303.

The registration unit 301 is for receiving registrations of an agent and a gathering device.

For example, the registration unit 301 may receive a registration from the agent in the following way:
receiving a registration request of the agent, an identification of the agent and an acquiring index supported by the agent; and
returning a registration accomplishment message to the agent.

The agent accomplishes its registration at the task distribution server after receiving the registration accomplishment message returned from the registration unit 301.

The receiving unit 302 is for receiving an acquiring instruction sent by the gathering device. The receiving unit 302 may receive the acquiring instruction sent by the gathering device after the registration unit 301 receives the registration of the gathering device. One task distribution server may receive acquiring instruction(s) sent by one or multiple gathering devices.

The sending unit 303 is for sending the acquiring instruction to the agent to instruct the agent to acquire monitoring data. The agent may acquire the monitoring data once the acquiring instruction is sent to the agent via the task distribution server.

Figure 4:
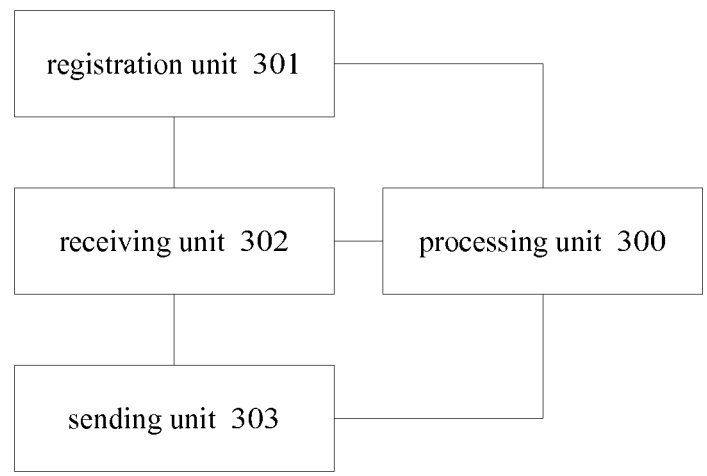
FIG. 4 is a schematic diagram of a task distribution server according to a fourth embodiment of the disclosure.

FIG. 4 is a schematic diagram of a task distribution server according to a fourth embodiment of the disclosure. The task distribution server according to the embodiment may be a preferred embodiment of the task distribution server according to the third embodiment. The task distribution server further includes a processing unit 300 in addition to the registration unit 301, the receiving unit 302 and the sending unit 303 disclosed according to the third embodiment.

In the system for acquiring the monitoring data according to the aforementioned embodiments of the disclosure, the agent 20 may further have a sleep state in which no acquisition is performed, to reduce unnecessary loss. The receiving unit 302 is further for receiving a task assignment request from the agent before the task distribution server sends an acquiring instruction to the agent to instruct the agent to acquire monitoring data. The processing unit 300 is for determining whether there is a task to be allocated. The sending unit 303 is for returning, if it is determined that no task is to be allocated, a no task message to the agent to make the agent enter the sleep state.

For timely detecting a state of the agent and better using the agent in an idle state, the receiving unit 302 according to the embodiment of the disclosure is further for receiving a pre-gathering message from the agent before the task distribution server sends the acquiring instruction to the agent to instruct the agent to acquire the monitoring data. The pre-gathering message indicates that the agent is in the idle state. The processing unit 300 is further for determining that the agent is in the idle state, after the receiving unit 302 receives the pre-gathering message from the agent.

For performing a targeted acquisition based on the acquiring index, in the task distribution server according to the embodiment of the disclosure, the acquiring instruction includes an identification of an agent to perform the acquisition, the acquiring index and a data transmission mode. The processing unit 300 is further for reading the identification of the agent, the acquiring index and the data transmission mode from the acquiring instruction. The sending unit 303 is for sending the acquiring instruction to an agent corresponding to the identification and assigning the acquiring index and the data transmission mode to the agent corresponding to the identification. Furthermore, the receiving unit 302 is for receiving monitoring data corresponding to the acquiring index, which is sent in the data transmission mode by the agent corresponding to the identification, after the task distribution server sends the acquiring instruction to the agent corresponding to the identification and assigns the acquiring index and the data transmission mode to the agent corresponding to the identification. The sending unit 303 is for sending the monitoring data corresponding to the acquiring index to a gathering device.

An agent is further provided according to an embodiment of the disclosure. The agent may be applied to the system for acquiring the monitoring data according to the aforementioned embodiments of the disclosure.

Figure 5:
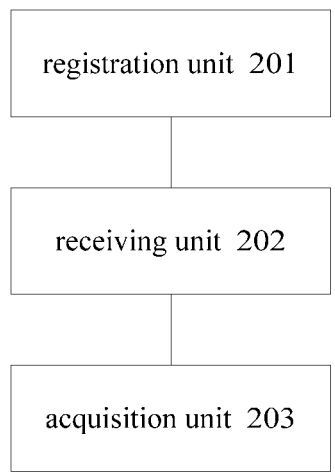
FIG. 5 is a schematic diagram of an agent according to a fifth embodiment of the disclosure.

FIG. 5 is a schematic diagram of an agent according to a fifth embodiment of the disclosure.

As shown in FIG. 5, the agent according to the embodiment includes a registration unit 201, a receiving unit 202 and an acquisition unit 203.

The registration unit 201 is for registering at a task distribution server.

For example, the registration unit 201 is for registering at the task distribution server in the following way:

sending a registration request, an identification of the agent and an acquiring index supported by the agent to the task distribution server; and receiving a registration accomplishment message returned form the task distribution server, to accomplish a registration at the task distribution server.

The receiving unit 202 is for receiving an acquiring instruction sent by the task distribution server. The acquiring instruction is sent to the task distribution server by a gathering device and is for instructing the agent to acquire monitoring data.

The acquisition unit 203 is for acquiring the monitoring data in response to the acquiring instruction.

According to the embodiment, the agent acquires the monitoring data once receiving the acquiring instruction sent by the task distribution server. Hence, the flexibility in acquiring the monitoring data is improved.

For reducing unnecessary loss, the agent according to the embodiment of the disclosure may have a sleep state in which no acquisition is performed.

Figure 6:
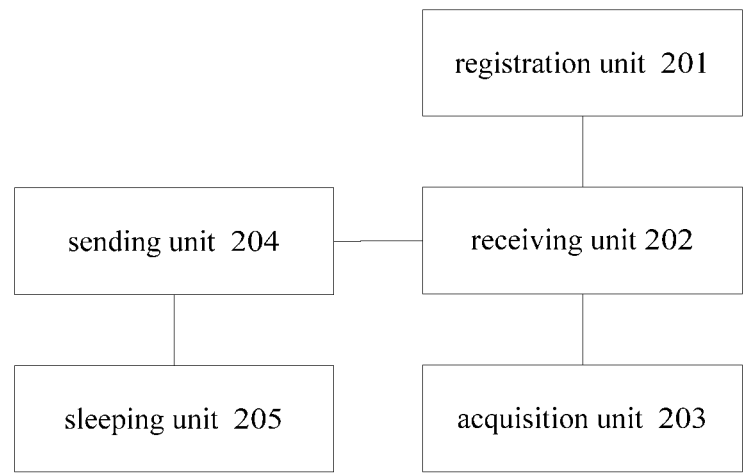
FIG. 6 is a schematic diagram of an agent according to a sixth embodiment of the disclosure.

FIG. 6 is a schematic diagram of an agent according to a sixth embodiment of the disclosure. The agent according to the embodiment may be a preferred embodiment of the agent shown in FIG. 5.

As shown in FIG. 6, the agent further includes a sending unit 204 and a sleeping unit 205 in addition to the registration unit 201, the receiving unit 202 and the acquisition unit 203 disclosed according to the fifth embodiment.

The sending unit 204 is for sending a task assignment request to a task distribution server before the agent receives an acquiring instruction sent by the task distribution server.

The sleeping unit 205 is for making the agent enter a sleep state after receiving a no task message returned from the task distribution server. The task distribution server returns the no task message to the agent if it is determined by the task distribution server that there is no task to be allocated.

The sending unit 204 is further for sending a pre-gathering message to the task distribution server before the agent receives the acquiring instruction sent by the task distribution server. The pre-gathering message indicates that the agent is in an idle state.

For performing a targeted acquisition based on an acquiring index, in the agent according to the embodiment of the disclosure, the acquiring instruction includes an identification of an agent to perform the acquisition, the acquiring index and a data transmission mode.

Figure 7:
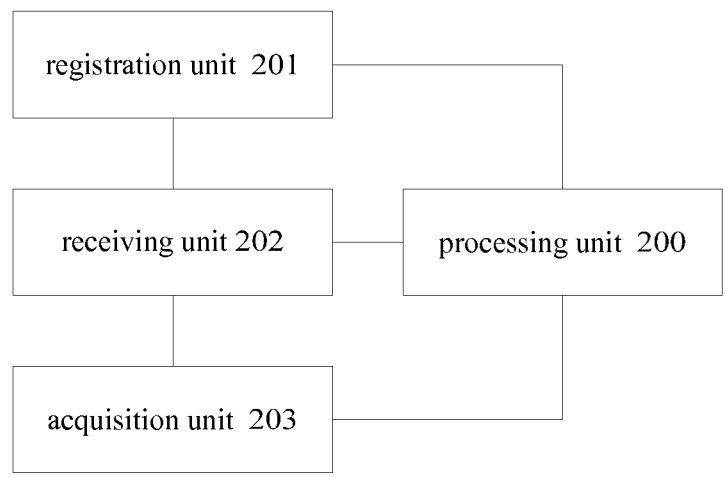
FIG. 7 is a schematic diagram of an agent according to a seventh embodiment of the disclosure.

FIG. 7 is a schematic diagram of an agent according to a seventh embodiment of the disclosure. The agent according to the embodiment may be a preferred embodiment of the agent shown in FIG. 5 or 6.

As shown in FIG. 7, the agent according to the embodiment further includes a processing unit 200 in addition to the registration unit 201, the receiving unit 202 and the acquisition unit 203 disclosed according to the fifth embodiment.

The processing unit 200 is for reading an acquiring index and a data transmission mode from an acquiring instruction. The acquisition unit is for acquiring monitoring data corresponding to the acquiring index and transmitting the acquired monitoring data in the data transmission mode.

A gathering device is further provided according to an embodiment of the disclosure. The gathering device may be applied to the system for acquiring the monitoring data according to the aforementioned embodiments of the disclosure.

Figure 8:
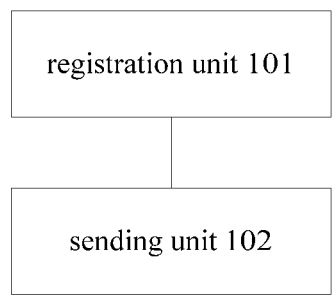
FIG. 8 is a schematic diagram of a gathering device according to an eighth embodiment of the disclosure.

FIG. 8 is a schematic diagram of a gathering device according to an eighth embodiment of the disclosure.

As shown in FIG. 8, the gathering device according to the embodiment includes a registration unit 101 and a sending unit 102.

The registration unit 101 is for registering at a task distribution server.

For example, the registration unit 101 is for registering at the task distribution server in the following way:

sending a registration request to the task distribution server by the gathering device; and receiving, by the gathering device, a registration accomplishment message returned from the task distribution server, to accomplish a registration at the task distribution server.

The sending unit 102 is for sending an acquiring instruction to the task distribution server, where the task distribution server sends the acquiring instruction to an agent to instruct the agent to acquire monitoring data.

The acquiring instruction includes an identification of an agent to perform an acquisition, an acquiring index and a data transmission mode. For performing a targeted acquisition based on the acquiring index, in the gathering device according to the embodiment of the disclosure, the sending unit 102 is for sending the acquiring instruction including the identification of the agent, the acquiring index and the data transmission mode to the task distribution server, where the task distribution server sends the acquiring instruction to an agent corresponding to the identification and assigns the acquiring index and the data transmission mode to the agent corresponding to the identification.

Figure 9:
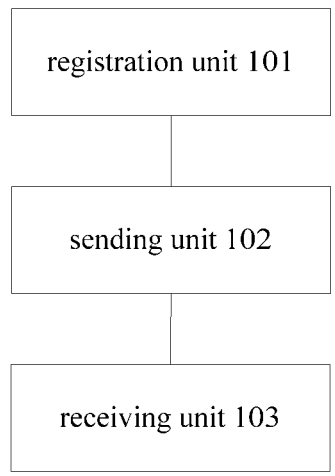
FIG. 9 is a schematic diagram of a gathering device according to a ninth embodiment of the disclosure.

FIG. 9 is a schematic diagram of a gathering device according to a ninth embodiment of the disclosure. The gathering device according to the embodiment may be a preferred embodiment of the gathering device shown in FIG. 8.

As shown in FIG. 9, the gathering device according to the embodiment further includes a receiving unit 103 in addition to the registration unit 101 and the sending unit 102 disclosed according to the eighth embodiment.

The receiving unit 103 is for receiving the monitoring data which corresponds to the acquiring index and is sent in the data transmission mode, after the acquiring instruction including the identification of the agent, the acquiring index and the data transmission mode is sent to the task distribution server to make the task distribution server send the acquiring instruction to the agent corresponding to the identification and assign the acquiring index and the data transmission mode to the agent corresponding to the identification.

A method for acquiring monitoring data is further provided according to an embodiment of the disclosure. The method may be applied to the system for acquiring the monitoring data according to the aforementioned embodiments of the disclosure, and the system for acquiring the monitoring data according to the aforementioned embodiments of the disclosure may be used to implement the method for acquiring the monitoring data according to the embodiment of the disclosure.

Figure 10:
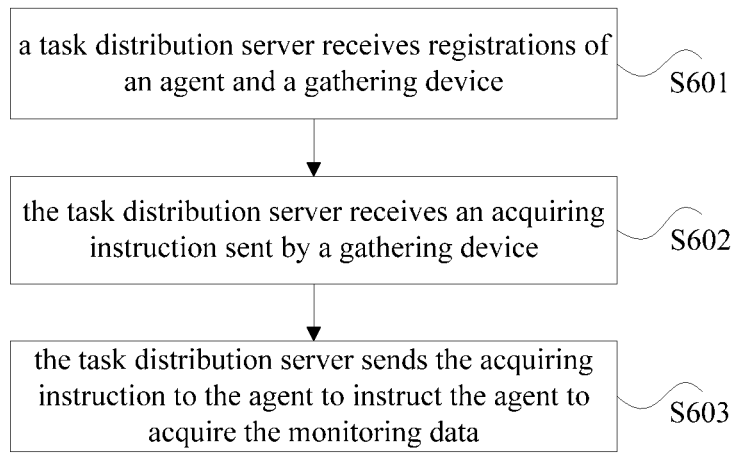
FIG. 10 is a flowchart of a method for acquiring monitoring data according to a tenth embodiment of the disclosure.

FIG. 10 is a flowchart of a method for acquiring monitoring data according to a tenth embodiment of the disclosure.

As shown in FIG. 10, the method for acquiring the monitoring data according to the embodiment includes steps S601-S603.

In the step S601, a task distribution server receives registrations of an agent and a gathering device.

For example, the task distribution server may receive the registration of the agent in the following way:

receiving, by the task distribution server, a registration request of the agent, an identification of the agent and an acquiring index supported by the agent; and returning, by the task distribution server, a registration accomplishment message to the agent.

When registering at the task distribution server, the agent may send an IP of the agent and an acquiring index supported by the agent to the task distribution server. A unique identification of the agent (e.g., the IP) and the acquiring index supported by the agent may be determined after the agent registers at the task distribution server.

In the step S602, the task distribution server receives an acquiring instruction sent by a gathering device.

In the step S603, the task distribution server sends the acquiring instruction to the agent to instruct the agent to acquire the monitoring data.

For reducing unnecessary loss, before the step S603, the method for acquiring the monitoring data according to the embodiment of the disclosure may further includes:

receiving, by the task distribution server, a task assignment request sent by the agent;

determining, by the task distribution server, whether there is a task to be allocated; and returning, by the task distribution server, a no task message to the agent if the task distribution server determines that there is no task to be allocated, to instruct the agent to enter a sleep state.

In the case of no task, the agent may enter the sleep state in which no acquisition is performed.

For timely acquiring a state of the agent, before the step S603, the method for acquiring the monitoring data according to the embodiment of the disclosure may further include:

receiving, by the task distribution server, a pre-gathering massage sent from the agent, where the pre-gathering massage indicates that the agent is in an idle state; and determining by the task distribution server that the agent is in the idle state, after the task distribution server receives the pre-gathering message sent from the agent.

In this way, the task distribution server may timely know whether the agent is in the idle state.

For improving targetedness and accuracy of a data acquisition, the acquiring instruction includes an identification of an agent to perform the acquisition, an acquiring index and a data transmission mode.

The task distribution server reads the identification of the agent, the acquiring index and the data transmission mode from the acquiring instruction after receiving the acquiring instruction sent by the gathering device, The task distribution server sends the acquiring instruction to the agent to instruct the agent to acquire the monitoring data in the following way:

sending the acquiring instruction to an agent corresponding to the identification and assigning the acquiring index and the data transmission mode to the agent corresponding to the identification, by the task distribution server.

After the task distribution server sends the acquiring instruction to the agent corresponding to the identification and assigns the acquiring index and the data transmission mode to the agent corresponding to the identification, the method for acquiring the monitoring data further includes:

receiving, by the task distribution server, the monitoring data which corresponds to the acquiring index and is sent in the data transmission mode by the agent corresponding to the identification; and sending, by the task distribution server, the monitoring data corresponding to the acquiring index to the gathering device.

In the method for acquiring the monitoring data according to the embodiment of the disclosure, after the gathering device and the agent register at the task distribution server, the gathering device may send the acquiring instruction to the agent via the task distribution server, and the agent acquires the monitoring data in response to the acquiring instruction and reports the monitoring data. Hence, the gathering device may actively gather the monitoring data and a flexibility in acquiring the monitoring data is improved.

Figure 11:
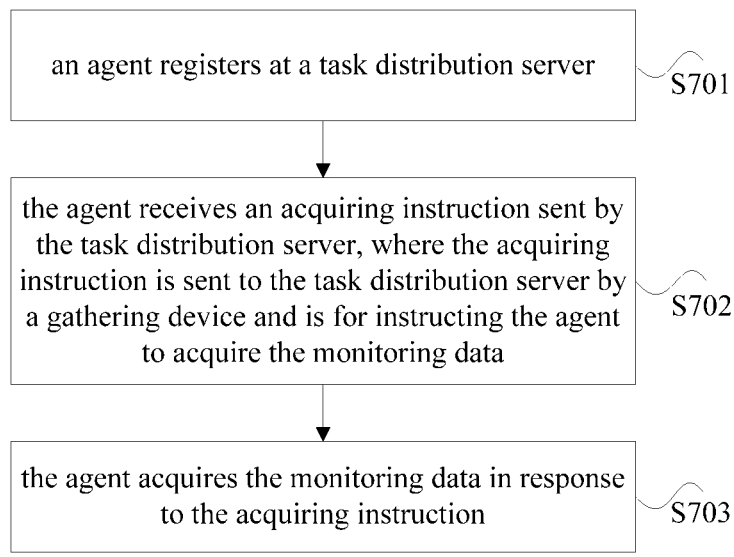
FIG. 11 is a flowchart of a method for acquiring monitoring data according to an eleventh embodiment of the disclosure.

FIG. 11 is a flowchart of a method for acquiring monitoring data according to an eleventh embodiment of the disclosure.

As shown in FIG. 11, the method for acquiring the monitoring data according to the embodiment includes steps S701-S703.

In the step S701, an agent registers at a task distribution server.

For example, the agent may register at the task distribution server in the following way:

sending a registration request, an identification of the agent and an acquiring index supported by the agent to the task distribution server by the agent; and receiving, by the agent, a registration accomplishment message returned from the task distribution server, to accomplish a registration at the task distribution server.

In the step S702, the agent receives an acquiring instruction sent by the task distribution server, where the acquiring instruction is sent to the task distribution server by a gathering device and is for instructing the agent to acquire the monitoring data.

In the step S703, the agent acquires the monitoring data in response to the acquiring instruction.

For reducing unnecessary loss, before the agent receives the acquiring instruction sent by the task distribution server, the method for acquiring the monitoring data according to the embodiment of the disclosure further includes:

sending a task assignment request to the task distribution server by the agent; and returning, by the task distribution server, a no task message to the agent if the task distribution server determines that there is no task to be allocated, where the agent enters a sleep state after receiving the no task message returned from the task distribution server.

In this way, the agent may enter the sleep state and perform no acquisition, in the case of no task.

For timely acquiring a state of the agent, the method for acquiring the monitoring data according to the embodiment of the disclosure may further include:

sending a pre-gathering message to the task distribution server by the agent, where the pre-gathering message indicates that the agent is in an idle state.

The acquiring instruction may include an identification of an agent to perform an acquisition, an acquiring index and a data transmission mode. For improving targetedness and accuracy of a data acquisition, the agent reads the acquiring index and the data transmission mode from the acquiring instruction after receiving the acquiring instruction sent by the task distribution server, and the agent acquires monitoring data corresponding to the acquiring index and transmits the acquired monitoring data in the data transmission mode.

Figure 12:
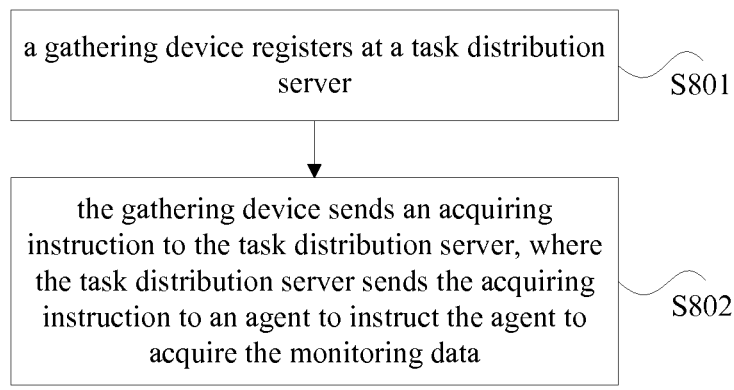
FIG. 12 is a flowchart of a method for acquiring monitoring data according to a twelfth embodiment of the disclosure.

FIG. 12 is a flowchart of a method for acquiring monitoring data according to a twelfth embodiment of the disclosure.

As shown in FIG. 12, the method for acquiring the monitoring data according to the embodiment includes steps S801-S802.

In the step S801, a gathering device registers at a task distribution server.

For example, the gathering device registers at the task distribution server in the following way:

sending a registration request to the task distribution server by the gathering device; and receiving, by the gathering device, a registration accomplishment message returned from the task distribution server, to accomplish a registration at the task distribution server.

In the step S802, the gathering device sends an acquiring instruction to the task distribution server, where the task distribution server sends the acquiring instruction to an agent to instruct the agent to acquire the monitoring data.

The acquiring instruction may include an identification of an agent to perform an acquisition, an acquiring index and a data transmission mode. For improving targetedness and accuracy of a data acquisition, the gathering device sends the acquiring instruction including the identification of the agent, the acquiring index and the data transmission mode to the task distribution server, to make the task distribution server send the acquiring instruction to an agent corresponding to the identification and assign the acquiring index and the data transmission mode to the agent corresponding to the identification; and then the task distribution server receives the monitoring data which corresponds to the acquiring index and is transmitted in the data transmission mode.

Accordingly, a flexibility in acquiring the monitoring data is improved with the method for acquiring the monitoring data according to embodiment of the disclosure.

A computer storage medium is further provided according to an embodiment of the disclosure. A program may be stored in the computer storage medium and the program is for performing part of or all of the steps disclosed in the above methods.

It should be noted that, the above method embodiments are described as a series of steps for simplicity. However, it should be understood by those skilled in the art that, the disclosure is not limited to the described orders of the steps. Some steps may be performed in other orders or may be performed simultaneously. It also should be understood by those skilled in the art that, the embodiments described in the specification are preferred embodiments, and steps and modules disclosed according to the embodiments are not necessary.

The above embodiments are described with different emphasis. A portion which is not detailed according to one embodiment may be referred to related descriptions of other embodiments.

It should be understood that, the devices disclosed according to the embodiments of the disclosure may be implemented in other manners. The device embodiments described above are only exemplary. For example, the devices are merely divided into units based on logical functions and may be divide with other approaches in practice, for example, multiple units or components may be combined together or may be integrated into another system, or, some features may be omitted or may not be performed. In addition, shown or discussed couplings, direct couplings or communication connections may be implemented through indirect couplings or communication connections between some interfaces, devices or units, and may be electrical or in other forms.

The units described as separate components may be or may not be separate physically. The components displayed as units may be or may not be physical units, that is, the components may be located in one place or may be distributed on multiple network units. Part of or all of the units may be chosen based on requirements to achieve the technical solution of the disclosure.

Moreover, function units disclosed according to the embodiments of the disclosure may be integrated in one processing unit, or the units are physically independent from each other, or two or more function units may be integrated in one unit. The integrated unit(s) may be implemented through hardware or through a software function unit.

In the case that the integrated unit(s) is implemented through the software function unit and is sold and used as an individual product, the individual product may be stored in a computer readable storage medium. Accordingly, the essence of the technical solution of the disclosure, a part of the disclosure contributing to conventional technologies or the whole or part of the technical solution may be embodied as a software product which is stored in a storage medium and includes multiple instructions for instructing a computer device (which may be a personal computer, a server, network equipment or the like) to perform all of or part of the steps of the methods according to the embodiments of the disclosure. The storage medium may include any medium which can store program codes, such as a USB flash disk, a Read-Only Memory (ROM), a Random Access Memory (RAM), a removable hard disk, a magnetic disk or an optical disk.

The described embodiments are only preferred embodiments of the disclosure and are not intended to limit the disclosure. Various modifications and changes to the disclosure are apparent for those skilled in the art. Any change, equivalent substitution, improvement or the like obtained without departing from the spirit and principles of the disclosure should all fall in the scope of protection of the disclosure.

The invention claimed is:

1. A method for acquiring monitoring data in a network, comprising:

in the network, wherein the network includes a task distribution server, a plurality of agents, and a gathering device:

receiving, from a first agent, by the task distribution server, a first registration request of the first agent, an identification of the first agent and a plurality of acquiring indexes supported by the first agent;

in response to receiving the first registration request of the first agent, the identification of the first agent, and the plurality of acquiring indexes supported by the first agent, returning a registration accomplishment message to the first agent by the task distribution server;

receiving a second registration request from a gathering device by the task distribution server, wherein the gathering device is a data crawler;

receiving, by the task distribution server, an acquiring instruction sent by the gathering device; and sending the acquiring instruction to the first agent by the task distribution server, to instruct the first agent to acquire monitoring data, wherein:

the acquiring instruction comprises the identification of the first agent to perform an acquisition, a respective acquiring index which is one of the plurality of acquiring indexes supported by the first agent and a data transmission mode, and the monitoring data corresponds to the respective acquiring index which is one of the plurality of acquiring indexes supported by the first agent;

wherein the receiving, by the task distribution server, the acquiring instruction sent by the gathering device comprises:

reading the identification of the first agent, the respective acquiring index and the data transmission mode from the acquiring instruction by the task distribution server; and wherein the sending the acquiring instruction to the first agent by the task distribution server, to instruct the first agent to acquire the monitoring data comprises:

sending the acquiring instruction to the first agent corresponding to the identification in the acquiring instruction and assigning the respective acquiring index and the data transmission mode to the first agent, by the task distribution server;

wherein the agent directly reports the monitoring data to the gathering device.

2. The method for acquiring the monitoring data according to claim 1, wherein before the sending the acquiring instruction to the first agent by the task distribution server, to instruct the first agent to acquire the monitoring data, the method for acquiring the monitoring data further comprises:

receiving, by the task distribution server, a task assignment request sent from the first agent;

determining, by the task distribution server, whether there is a task to be allocated; and returning, by the task distribution server, a no task message to the first agent if the task distribution server determines that there is no task to be allocated, to make the first agent to enter a sleep state.

3. The method for acquiring the monitoring data according to claim 1, wherein before the sending the acquiring instruction to the first agent by the task distribution server, to instruct the first agent to acquire the monitoring data, the method for acquiring the monitoring data further comprises:

receiving, by the task distribution server, a pre-gathering message sent from the first agent, wherein the pre-gathering message indicates that the first agent is in an idle state; and determining by the task distribution server that the first agent is in the idle state, after the pre-gathering message sent from the first agent is received by the task distribution server.

4. A task distribution server, comprising a processor and a memory storing program codes, wherein the processor performs the stored program codes to:

in a network including the task distribution server, a plurality of agents, and a gathering device:

receive, from a first agent, a first registration request of the first agent, an identification of the first agent and a plurality of acquiring indexes supported by the first agent;

in response to receiving the first registration request of the first agent, the identification of the first agent, and the plurality of acquiring indexes supported by the first agent, return a registration accomplishment message to the first agent;

receive a second registration request from a gathering device, wherein the gathering device is a data crawler;

receive an acquiring instruction sent by the gathering device; and send the acquiring instruction to the first agent to instruct the first agent to acquire monitoring data;

wherein:

the acquiring instruction comprises the identification of the first agent to perform an acquisition, a respective acquiring index which is one of the plurality of acquiring indexes supported by the first agent and a data transmission mode, and the monitoring data corresponds to the respective acquiring index which is one of the plurality of acquiring indexes supported by the first agent;

the processor further performs the stored program codes to read the identification of the first agent, the respective acquiring index and the data transmission mode from the acquiring instruction; and the processor further performs the stored program codes to send the acquiring instruction to the first agent corresponding to the identification in the acquiring instruction and assign the respective acquiring index and the data transmission mode to the first agent;

wherein the agent directly reports the monitoring data to the gathering device.

5. The task distribution server according to claim 4, wherein the processor further performs the stored program codes to:

before the task distribution server sends the acquiring instruction to the first agent to instruct the first agent to acquire the monitoring data, receive a task assignment request sent from the first agent; and determine whether there is a task to be allocated, and if it is determined that there is no task to be allocated, return a no task message to the first agent to make the first agent enter a sleep state.

6. The task distribution server according to claim 4, wherein the processor further performs the stored program codes to:

before the task distribution server sends the acquiring instruction to the first agent to instruct the first agent to acquire the monitoring data, receive a pre-gathering message sent from the first agent, wherein the pre-gathering message indicates that the first agent is in an idle state, and after the task distribution server receives the pre-gathering message sent from the first agent, determine that the first agent is in the idle state.

7. A first agent, comprising a processor and a memory storing program codes, wherein the processor performs the stored program codes to:
- in the network, wherein the network includes a task distribution server, a plurality of agents, and a gathering device:
    - send a first registration request, an identification of the first agent and a plurality of acquiring indexes supported by the first agent to a task distribution server;
    - in response to sending the first registration request of the first agent, the identification of the first agent, and the plurality of acquiring indexes supported by the first agent, receive a registration accomplishment message from the task distribution server; wherein the task distribution server further receives a second registration request from a gathering device that is a data crawler to register at the task distribution server;
    - receive an acquiring instruction sent by the task distribution server, wherein the acquiring instruction is sent to the task distribution server by the gathering device and the acquiring instruction is configured to instruct the first agent to acquire monitoring data; and
    - acquire the monitoring data in response to the acquiring instruction;
    - wherein:
        - the acquiring instruction comprises the identification of the first agent to perform an acquisition, a respective acquiring index which is one of the plurality of acquiring indexes supported by the first agent and a data transmission mode, and
        - the monitoring data corresponds to the respective acquiring index which is one of the plurality of acquiring indexes supported by the first agent;
    - the processor further performs the stored program codes to acquire monitoring data corresponding to the acquiring index and transmit the acquired monitoring data in the data transmission mode;
    - wherein the first agent directly reports the monitoring data to the gathering device.

8. The first agent according to claim 7, wherein the processor further performs the stored program codes to:
- before the first agent receives the acquiring instruction sent by the task distribution server, send a task assignment request to the task distribution server; and
- after a no task message returned from the task distribution server is received, make the first agent enter a sleep state, wherein the task distribution server returns the no task message to the agent if the task distribution server determines that there is no task to be allocated.

9. The first agent according to claim 7, wherein the processor further performs the stored program codes to:
- before the first agent receives the acquiring instruction sent by the task distribution server, send a pre-gathering message to the task distribution server, wherein the pre-gathering message indicates that the first agent is in an idle state.

* * * * *